United States Patent
Sturgeon

[15] 3,695,280
[45] Oct. 3, 1972

[54] CONTACT LENS CASE

[72] Inventor: Robert G. Sturgeon, Sunnyvale, Calif.

[73] Assignee: Barnes-Hind Pharmaceuticals, Inc., Sunnyvale, Calif.

[22] Filed: Jan. 15, 1971

[21] Appl. No.: 106,842

[52] U.S. Cl. .......................134/166 R, 206/5 A
[51] Int. Cl. ........................A45c 11/04, B08b 3/04
[58] Field of Search............134/137, 166 R; 206/5 A

[56] References Cited

UNITED STATES PATENTS

| | | |
|---|---|---|
| 3,394,717 | 7/1968 | Hollinger................134/137 |
| 3,268,068 | 8/1966 | Le Grand................206/5 A |
| 3,536,082 | 10/1970 | Kolbeck..................134/137 |
| 3,460,552 | 8/1969 | Sturgeon................206/5 A X |
| 3,586,012 | 6/1971 | Paule.....................206/5 A X |

FOREIGN PATENTS OR APPLICATIONS 1,130,853  10/1968  Great Britain............206/5 A

*Primary Examiner*—Daniel Blum
*Attorney*—Eckhoff & Hoppe

[57] ABSTRACT

A contact lens case made of a soft plastic is described having a reservoir therein so that the lenses can be kept immersed in a soaking solution. A simple two piece structure is provided which is easily made by injection molding and an abutment means is provided between the top and bottom of the case to prevent collapse of the case.

4 Claims, 5 Drawing Figures

INVENTOR.
ROBERT G. STURGEON

INVENTOR.
ROBERT G. STURGEON
BY
ATTORNEYS

CONTACT LENS CASE

SUMMARY OF THE INVENTION

It has long been rocognized that contact lenses should be stored in a suitable soaking solution when they are not in use. Such storage insures that the lens will be fully hydrated and comfortable when subsequently worn.

Heretofore contact lens cases suitable for use with liquids have been complicated and bulky.

The contact lens case of the present invention is a very simple structure and can be inexpensively molded from a soft plastic such as polypropylene.

The case is capable of containing a substantial quantity of liquid despite its small size. Further, the case is very compact so it can be slipped into a pocket or purse without difficulty.

The case is of such simple structure and so easily made that it is entirely practical to consider it as a disposable item which might be packaged with a soaking or wetting solution.

Another advantage of the case of the present invention is that it seals very tightly so that there is no danger of leakage in a pocket or purse. Despite the tight seal, the covers are not screwed on but are merely snapped on, largely obviating any possibility of injuring a lens. A further advantage of the invention is the provision of an abutment between the top and bottom of the case to prevent collapse of the case.

Other features of the invention will be apparent from the specification.

BRIEF DESCRIPTION OF THE DRAWINGS

In the drawings forming part of this application.

DESCRIPTION OF THE PREFERRED EMBODIMENTS

Figure 1:
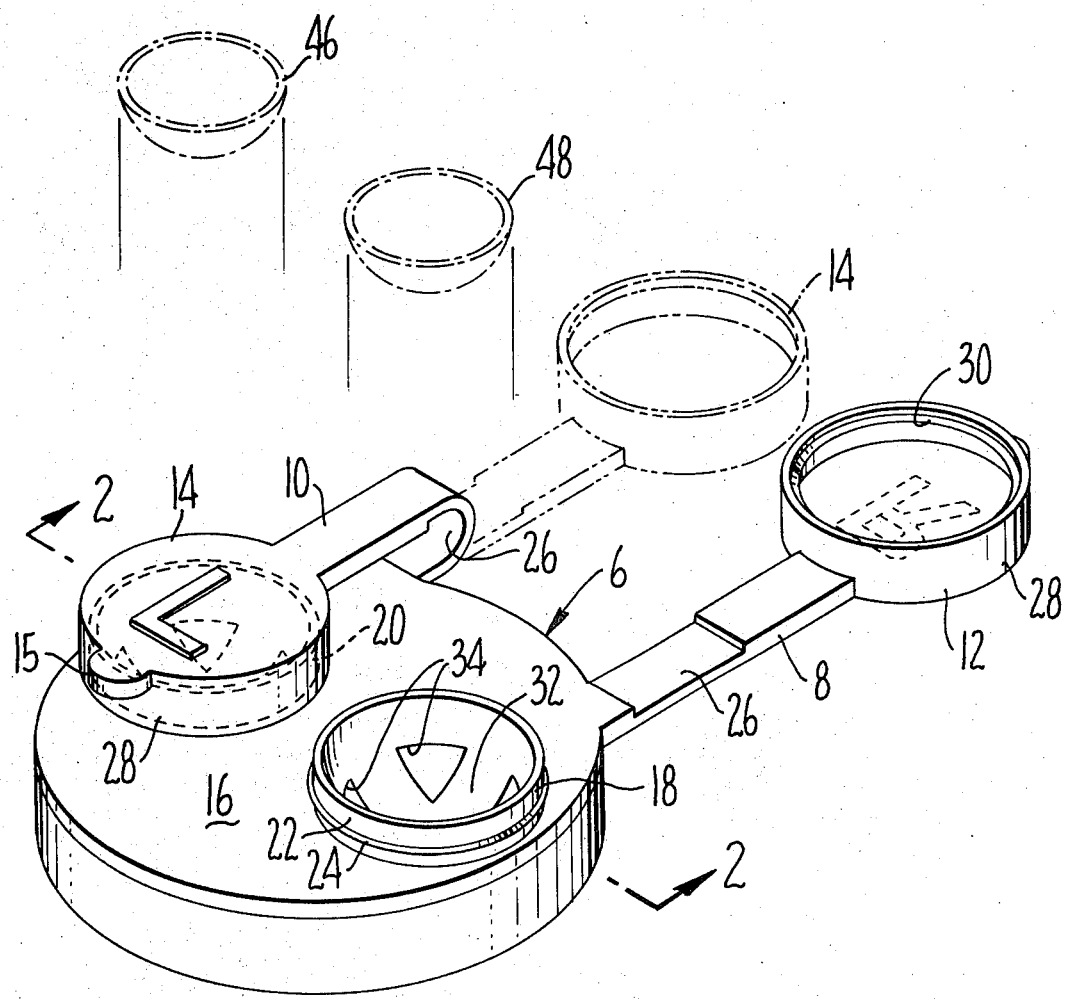
FIG. 1 is a perspective view of a contact lens case embodying the present invention.
Figure 2:
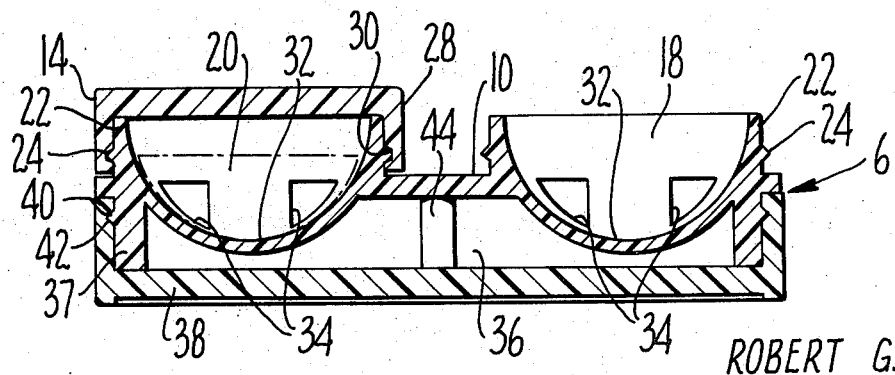
FIG. 2 is a section on the line 2—2 of FIG. 1.
Figure 3:
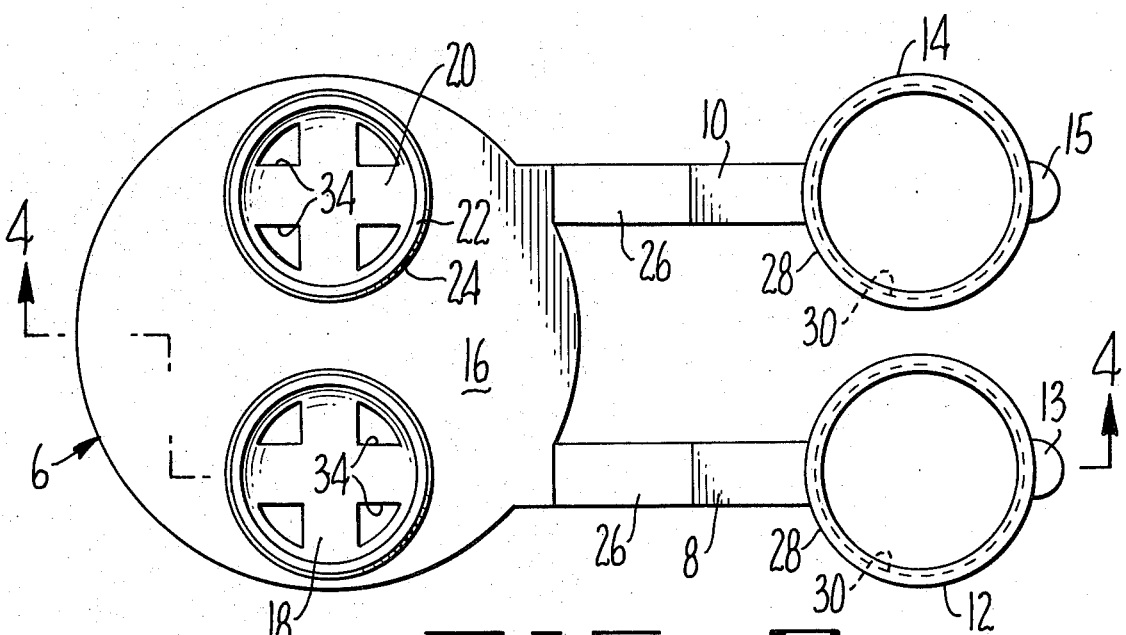
FIG. 3 is a plan view of the case of the present invention showing it in open position.
Figure 4:
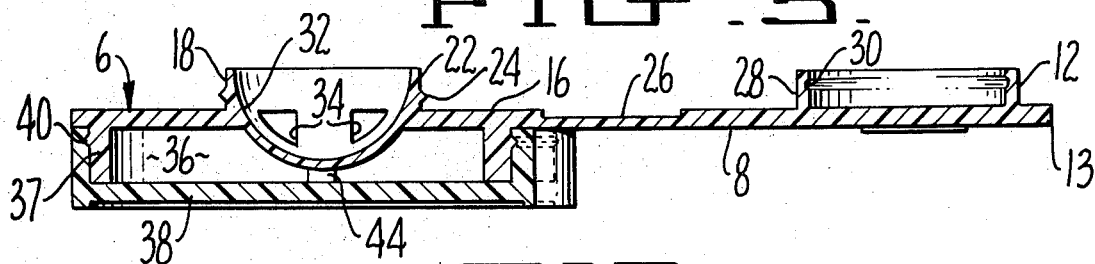
FIG. 4 is a section on the line 4—4 of FIG. 3.
Figure 5:
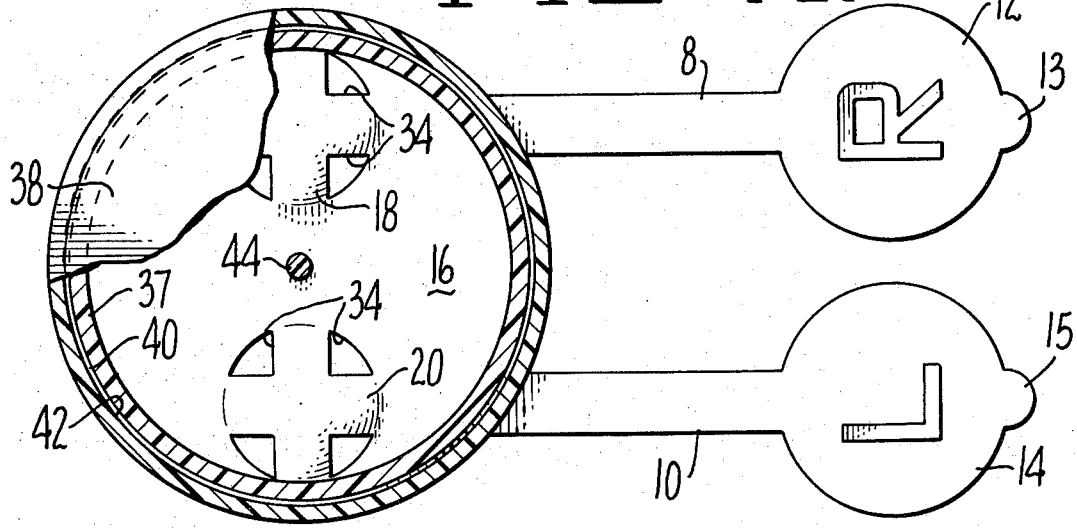
FIG. 5 is a bottom view of the contact lens case of the present invention with some parts cut away to illustrate the construction.

Referring now to the drawings by reference characters, the case of the present invention includes a main body portion generally designated 6 with two arms extending therefrom designated 8 and 10 to which are attached the caps 12 and 14 for retaining the lenses in place. The body 6 has a top plate 16 from which extend the cups 18 and 20. Each of the cups has a raised wall 22 and an annular rim or rib 24 spaced somewhat below the top of the wall 22. The arms 8 and 10 are weakened as at 26 so that the caps 12 and 14 can be easily bent over the respective cups and snapped into place. The caps 12 and 14 have a side wall 28 which contains an annular recess or groove 30, the recess mating with the rim 24. The caps have small tabs 13 and 15 to aid in lifting them. The tabs also may have suitable indicia for identifying each lens, such as the letters L and R as shown.

The bottoms of the cups are rounded as at 32 and contain a plurality of openings 34 leading to the central chamber 36. The top portion 6 has a downwardly extending flange or wall 37 and on this is snapped the cup shaped bottom 38. The flange 37 has an annular ridge or rib 40 while the sidewall of the bottom 38 has a corresponding annular recess or groove 42 so that the parts merely snap together. A central post 44 formed as a part of the top 6 may be provided to prevent the case from being crushed if it is subjected to pressure in a pocket or the like.

In use, it is only necessary that the case be filled with a suitable wetting or soaking solution by pouring the solution in through one of the openings 34. Lenses, shown in phantom as 46 and 48 are then deposited in the cups and the respective caps folded over and snapped into place as is shown in the left hand portion of FIG. 1.

I claim:

1. A contact lens case for carrying contact lenses immersed in a soaking solution, comprising a housing having a cup-shaped bottom, said bottom including a bottom wall and a peripheral, upstanding side wall, a top including a top plate and a depending annular side wall on the bottom surface thereof, said depending annular side wall spaced inwardly from the marginal edge of said top plate and engaged at its outer surface with the inner surface of said upstanding side wall, cooperating annular rib and groove means on the confronting surfaces of said side walls effecting a sealed snap fit therebetween, said top and bottom defining a reservoir for liquid therebetween, a pair of contact lens receiving cups in said top plate in side-by-side relationship to one another, each said cup including a perforated bottom extending downwardly below the top plate and into said reservoir and an annular raised wall extending above the top plate, a pair of caps integrally joined to said top by a pair of flexible straps integrally connected at opposite ends to the top and to the caps, respectively, said straps each having a weakened portion therein to facilitate flexure thereof and positioning of said caps over said upstanding walls of said contact lens receiving cups to close said cups, cooperating annular rib and groove means on said raised walls and said caps effecting a sealed snap fit therebetween, and abutment means integral with said top plate on the underside thereof between said contact lens receiving cups and projecting downwardly toward said bottom wall and in juxtaposition therewith to engage the bottom wall and prevent deflection of said top plate toward said bottom wall when pressure is exerted on said top plate or bottom wall.

2. A contact lens case as in claim 1, wherein said abutment means comprises a central post on the underside of said top plate.

3. A contact lens case as in claim 2, wherein said case is made of a soft plastic material.

4. A contact lens case as in claim 3, wherein said annular ribs are on the outer circumference or surface of said raised walls and said depending side wall, and said annular grooves are in the caps and the inner circumference or surface of said upstanding side wall.

* * * * *